(12) United States Patent
Boada-Bauxell et al.

(10) Patent No.: US 10,597,168 B2
(45) Date of Patent: Mar. 24, 2020

(54) METHOD AND DEVICE FOR MANAGING CONFIGURATIONS OF AN AIRCRAFT

(71) Applicant: Airbus Operations S.A.S., Toulouse (FR)

(72) Inventors: Josep Boada-Bauxell, Toulouse (FR); Fabrice Bousquet, Balma (FR)

(73) Assignee: Airbus Operations S.A.S. (FR)

( * ) Notice: Subject to any disclaimer, the term of this patent is extended or adjusted under 35 U.S.C. 154(b) by 23 days.

(21) Appl. No.: 15/786,741

(22) Filed: Oct. 18, 2017

(65) Prior Publication Data

US 2018/0118372 A1 May 3, 2018

(30) Foreign Application Priority Data

Nov. 3, 2016 (FR) ..................................... 16 60609

(51) Int. Cl.
| | |
|---|---|
| *B64D 45/08* | (2006.01) |
| *G06K 9/00* | (2006.01) |
| *G08G 5/02* | (2006.01) |
| *G08G 5/00* | (2006.01) |
| *G06T 7/73* | (2017.01) |
| *G06T 7/13* | (2017.01) |

(52) U.S. Cl.
CPC ......... *B64D 45/08* (2013.01); *G06K 9/00637* (2013.01); *G06T 7/13* (2017.01); *G06T 7/73* (2017.01); *G08G 5/0021* (2013.01); *G08G 5/025* (2013.01); *G06T 2207/10016* (2013.01); *G06T 2207/10032* (2013.01); *G06T 2207/30181* (2013.01); *G06T 2207/30252* (2013.01)

(58) Field of Classification Search
None
See application file for complete search history.

(56) References Cited

U.S. PATENT DOCUMENTS

| | | | | | |
|---|---|---|---|---|---|
| 4,890,232 | A * | 12/1989 | Mundra | ............... | G08G 5/0008 701/120 |
| 6,952,632 | B2 * | 10/2005 | Robert | ................ | G05D 1/0676 340/951 |
| 7,089,092 | B1 * | 8/2006 | Wood | ...................... | G01S 19/15 342/33 |

(Continued)

FOREIGN PATENT DOCUMENTS

| | | |
|---|---|---|
| EP | 1 335 258 A1 | 8/2003 |
| EP | 2 296 129 A1 | 3/2011 |
| EP | 2 416 124 A2 | 2/2012 |

*Primary Examiner* — Nancy Bitar
(74) *Attorney, Agent, or Firm* — Lerner, David, Littenberg, Krumholz & Mentlik, LLP

(57) ABSTRACT

The device for assisting the landing of an aircraft in a phase of descent for the purpose of a landing on a runway with the help of an instrument landing assistance module includes an image capturing module for capturing a sequence of successive images of the ground, an image processing module, a monitoring module for detecting on the processed images at least one visual characteristic corresponding to a runway, a computation module for computing a current position of the aircraft and a comparison module for comparing the computed current position with a signal representative of a current position of the instrument landing assistance module, a go-around warning being transmitted to a display unit, if the current positions are not substantially identical.

9 Claims, 3 Drawing Sheets

(56) References Cited

U.S. PATENT DOCUMENTS

| | | | |
|---|---|---|---|
| 8,019,491 B1* | 9/2011 | McCusker | G08G 5/0086 |
| | | | 340/945 |
| 8,462,205 B2* | 6/2013 | Soler | G08G 5/025 |
| | | | 348/115 |
| 9,047,771 B1* | 6/2015 | Thoreen | G08G 5/045 |
| 10,347,142 B2* | 7/2019 | Brandao | G08G 5/045 |
| 2003/0225487 A1 | 12/2003 | Robert et al. | |
| 2010/0026525 A1* | 2/2010 | Feyereisen | G01O 5/005 |
| | | | 340/972 |
| 2013/0041529 A1* | 2/2013 | He | G08G 5/0021 |
| | | | 701/17 |
| 2016/0026183 A1* | 1/2016 | Williams | G06F 1/20 |
| | | | 701/23 |

\* cited by examiner

METHOD AND DEVICE FOR MANAGING CONFIGURATIONS OF AN AIRCRAFT

FIELD OF THE INVENTION

The present invention relates to a method and a device for assisting the landing of an aircraft in a phase of descent for the purpose of a landing on a runway.

BACKGROUND OF THE INVENTION

During a procedure of approach to a landing runway (also called "runway") of an airport, an aircraft can be guided for its landing on the runway by a radio navigation system. This radio navigation system can correspond to an instrument landing system (ILS, standing for "Instrument Landing System" in English). The ILS system comprises at least a transmitting station capable of transmitting guidance signals allowing the aircraft to come closer to a reference approach trajectory. Among these signals, there is notably a vertical guidance signal, otherwise called a descent alignment signal, making it possible for the aircraft to know the vertical deviation it has with respect to the reference approach trajectory. This vertical guidance signal is generally called the "Glide signal" or the "Glide slope signal". There is also a lateral guidance signal, otherwise called a runway alignment signal, making it possible for the aircraft to know then lateral deviation that it has with respect to the reference approach trajectory. This lateral guidance signal is generally called the "Localizer signal".

There are three categories of ILS systems. One of said categories, notably category I (CAT I), corresponds to a procedure making it possible for the aircraft to descent automatically down to a decision altitude of 200 feet (61 m) on condition that the runway visual range (RVR, standing for "Runway Visual Range" in English) is sufficient. If the pilot can see the approach lights of the runway, the aircraft can land under manual control. If not, a go-around must be initiated.

There is also an enhanced vision system (EVS, standing for "Enhanced Vision System" in English) which makes it possible to reduce the decision altitude from 200 feet (61 m) to 100 feet (30.5 m) with the help of infrared sensors. The pilot can then control the aircraft manually starting from 200 feet. If the infrared image shows the approach lights of the runway, the pilot can steer the aircraft based on the information provided by the infrared sensors. Below 100 feet, the sensors are deactivated by the pilot who must then check if the runway visual range is sufficient. If not, a go-around must be initiated.

However, this enhanced vision system necessitates the use of a head-up display ("head-up display" being the English term) upon which the pilot has to interpret the images coming from the infrared sensors.

BRIEF SUMMARY OF THE INVENTION

An aspect of the present invention may overcome this disadvantage by proposing a method making it possible to improve the use of the ILS system without necessitating a head-up display.

An aspect of the invention relates to a method for assisting the landing of an aircraft in a phase of descent for the purpose of a landing on a runway with the help of an instrument landing assistance module.

According to an aspect of the invention the method comprises the following steps:

an image capturing step, implemented by an image capturing module, consisting of capturing a sequence of successive images of the ground;

during the descent, if the aircraft is situated below a first altitude and above a second altitude lower than the first altitude, the method comprises:

an image processing step, implemented by an image processing module, consisting of processing the successive images captured in the image capturing step;

a monitoring step, implemented by a monitoring module, consisting of detecting on the images processed in the image processing step at least one visual characteristic corresponding to a runway, called a visual characteristic;

if at least one visual characteristic is detected during the monitoring step, the method comprises the following steps:

a computation step, implemented by a computation module, consisting of computing a current position of the aircraft relative to the runway on the basis of the visual characteristic or characteristics detected in the monitoring step;

a comparison step, implemented by a comparison module, consisting of comparing, on the one hand, the current position computed in the computation step with, on the other hand, a signal representative of a current position transmitted to the comparison module by the instrument landing assistance module;

if the current positions are not substantially identical, the method comprises a first transmission step, implemented by a first transmission module, consisting of transmitting a signal representative of a go-around warning to a first display unit.

The expression "visual characteristic" refers to at least one element making it possible to identify a runway. For example, the lights of a runway correspond to visual characteristics.

Thus, according to an aspect of the invention, it is possible to reduce the time when it is necessary for the pilot to visually and directly check the presence of the runway with the help of the image processing step. Another aspect of the invention also makes it possible to verify, by means of the comparison step, the accuracy of the current position determined on the basis of the ILS system.

According to one feature, the comparison step consists of comparing the current position computed by the computation module with the signal representative of a current position transmitted to the comparison module by the instrument landing assistance module by computing the distance between these two positions, the current positions being substantially identical if the distance is less than a predetermined limit value.

If no visual characteristic is detected in the monitoring step, the method comprises a second transmission step, implemented by a second transmission module, consisting of transmitting a signal representative of a go-around warning signal to the first display unit.

Moreover, the method comprises moreover a third transmission step, implemented by a third transmission module, consisting of transmitting the sequence of successive images to a second display unit.

According to a first example, the first altitude is substantially equal to 200 feet (61 m) and the second altitude is substantially equal to 100 feet (30.5 m).

According to a second example, the first altitude is substantially equal to 200 feet (61 m) and the second altitude is substantially equal to 50 feet (15.25 m).

The invention also relates to a device for assisting the landing of an aircraft in a phase of descent for the purpose of a landing on a runway with the help of an instrument landing assistance module.

According to an embodiment of the invention, the device comprises:

an image capturing module configured for capturing a sequence of successive images of the ground;

an image processing module configured for processing the successive images captured by the image capturing module, during the decent, if the aircraft is situated below a first altitude and above a second altitude lower than the first altitude;

a monitoring module configured for detecting on the images processed by the image processing module at least one visual characteristic corresponding to a runway, called a visual characteristic;

a computation module configured for computing a current position of the aircraft relative to the runway on the basis of the visual characteristic or characteristics detected by the monitoring module;

a comparison module configured for comparing, on the one hand, the current position computed by the computation module with, on the other hand, a signal representative of a current position transmitted to the comparison module by the instrument landing assistance module;

the computation module and the comparison module being used if at least one visual characteristic is detected by the monitoring module, a first transmission module configured for transmitting a signal representative of a go-around warning to a first display unit, if the current positions are not substantially identical.

According to one feature, the device comprises a second transmission module configured for transmitting a signal representative of a go-around warning to the first display unit, if no visual characteristic is detected by the monitoring module.

In addition, it comprises a third transmission module configured for transmitting the sequence of successive images to a second display unit.

The invention also relates to a landing system comprising:
a landing assistance device such as described above,
un instrument landing assistance module, and
at least one display unit.

The invention also relates to an aircraft, in particular a transport aircraft, which comprises a landing assistance device such as described above.

BRIEF DESCRIPTION OF THE DRAWINGS

The invention, with its features and advantages, will become more clearly apparent on reading the description given with reference to the appended drawings in which.

DETAILED DESCRIPTION

The continuation of the description will refer to the figures mentioned above.

Figure 1:
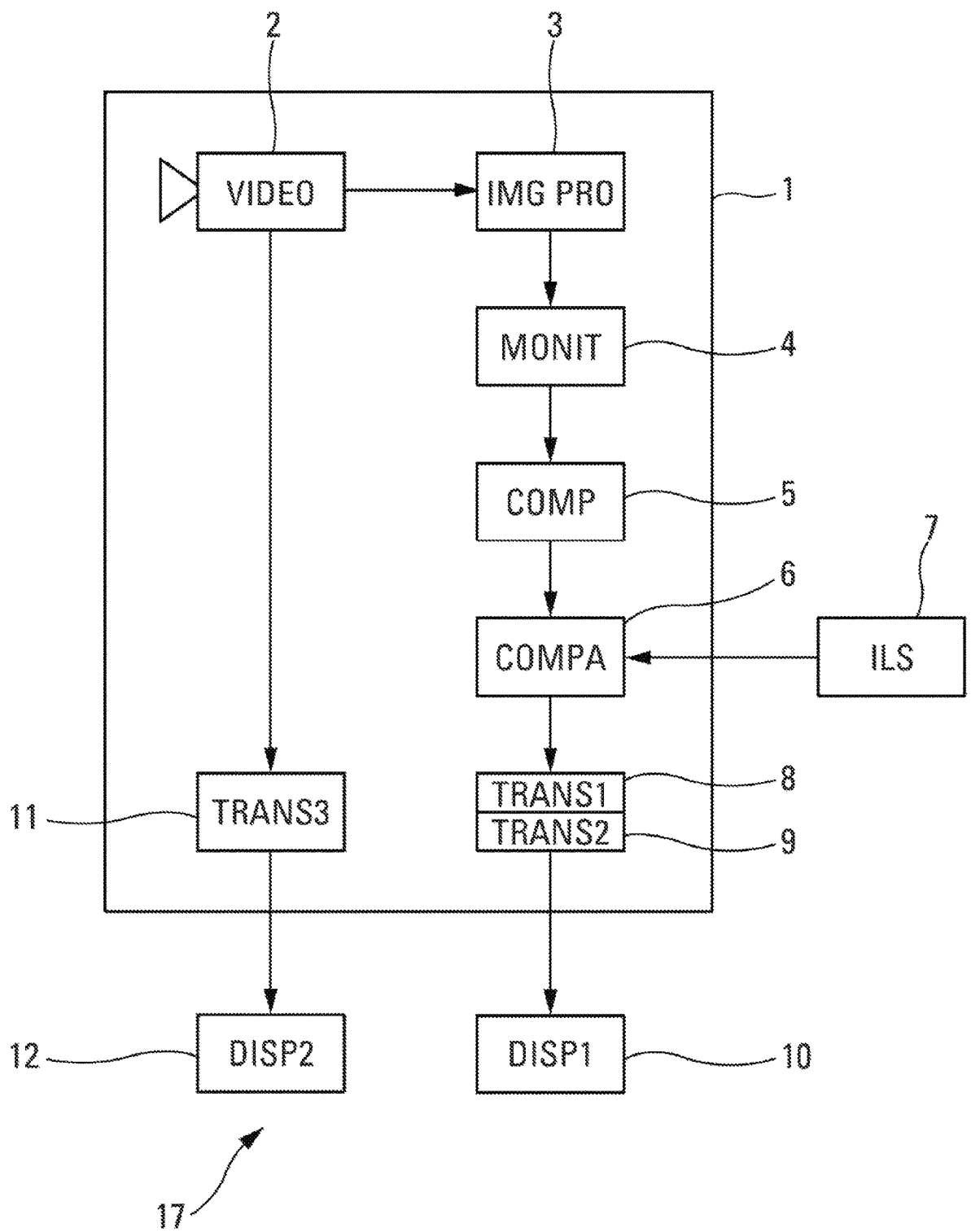
FIG. 1 corresponds to a block diagram of the landing assistance device in one embodiment

FIG. 1 shows an embodiment of the device 1 for assisting the landing of an aircraft AC in a phase of descent for the purpose of a landing on a runway T. The descent phase is carried out with the help of an ILS system 7 which will be called an instrument landing assistance module 7 in the continuation of the text.

The device 1 comprises an image capturing module 2 VIDEO (VIDEO, standing for "video module" in English), an image processing module 3 IMG PRO (IMG PRO standing for "image processing module" in English), a monitoring module 4 MONIT (MONIT standing for "monitoring module" in English), a computation module 5 COMP (COMP standing for "computational module" in English), a comparison module 6 COMPA (COMPA standing for "comparison module" in English) and a first transmission module 8 TRANS1 (TRANS standing for "transmission module" in English).

The image capturing module 2 is configured for capturing a sequence of successive images of the ground during the descent.

For example, the image capturing module 2 comprises an image capturing unit such as an infrared sensor, in particular a CCD camera which is sensitive to infrared radiation.

The image capturing module 2 comprises, for example, a temporary or permanent memory configured for storing the images captured by the image capturing unit.

Figure 2:
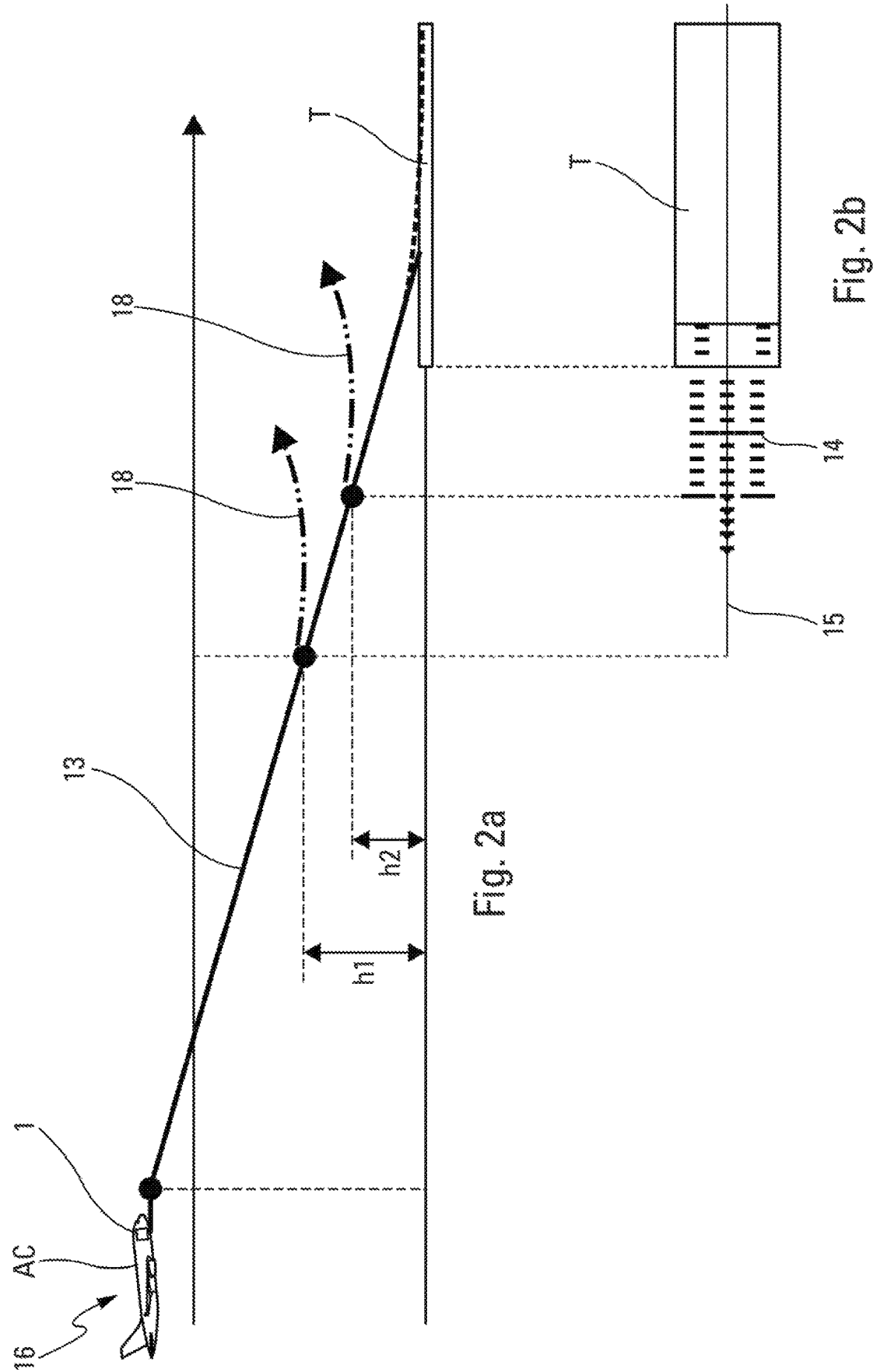
FIG. 2a shows the trajectory of an aircraft in a vertical plane.
FIG. 2b shows a plan view of a runway comprising visual characteristics.

The image processing module 3 and the monitoring module 4 are used during the descent of the aircraft AC if the aircraft AC is situated below a first altitude h1 and above a second altitude h2. FIG. 2a shows the descent trajectory 13 of the aircraft AC comprising the two altitudes h1 and h2.

According to a first example, the first altitude h1 is substantially equal to 200 feet (61 m) and the second altitude h2 is substantially equal to 100 feet (30.5 m). This first example can be applied for a category I instrument landing assistance module 7.

According to a second example, the first altitude h1 is substantially equal to 200 feet (61 m) and the second altitude h2 is substantially equal to 50 feet (15.25 m). This second example can be applied for a category III (CAT III) instrument landing assistance module 7.

The image processing module 3 is configured for processing the successive images provided by the image capturing module 2.

For example, the image processing module 3 can comprise a contour detection sub-module which makes it possible to detect the contours of image elements.

The monitoring module 4 is configured for detecting on the images processed by the image processing module 3 at least one visual characteristic 14 corresponding to a runway T, called a visual characteristic.

For example, a visual characteristic 14 corresponds to a characteristic positioning of the approach lights of a runway T. The approach lights can be detected by the contour detection sub-module.

FIG. 2b shows an example of visual characteristics 14.

According to another example, the monitoring module 4 implements the method of the document WO 2014/075657. In this method, the central axis 15 de the runway T is determined by a comparison between the characteristics of the image and the characteristics of the mirror image. The comparison is carried out by the superimposition of the characteristics of one side of the runway T and the characteristics of the other side of the runway T.

According to one embodiment, the device 1 comprises a second transmission module 9 TRANS2 configured for transmitting a signal representative of a go-around warning to the first display unit 10, if no visual characteristic is detected by the monitoring module 4.

The computation module 5 is configured for computing a current position 16 of the aircraft AC relative to the runway T on the basis of the visual characteristic or characteristics 14 detected by the monitoring module 4.

For example, the current position 16 can be computed as a function of the relative positions of the visual characteristics 14 which have been detected by the image processing module 3.

The comparison module 6 is configured for comparing, on the one hand, the current position 16 computed by the computation module 5 with, on the other hand, a current position determined from a signal representative of a current position transmitted to the comparison module 6 by the instrument landing assistance module 7.

The computation module 5 and the comparison module 6 are used if at least one visual characteristic 14 is detected by the monitoring module 4.

The comparison module 6 can be configured for comparing the current position 16 of the aircraft AC computed by the computation module 5 with the current position determined from the signal representative of a current position transmitted to the comparison module 6 by the instrument landing assistance module 7 by computing the distance between these two positions. The current positions are then considered to be substantially identical if the distance between these two positions is less than a predetermined limit value.

The first transmission module 8 is configured for transmitting a signal representative of a go-around warning to a first display unit 10 DISP1 (DISP standing for "Display unit" in English in order to request the pilot to initiate a go-around 18, if the current positions are not substantially identical.

For example, the first display unit 10 corresponds to a screen for displaying primary flight parameters (PFD standing for "Primary flight display" in English).

According to one configuration, the device 1 also comprises a third transmission module 11 TRANS3 configured for transmitting the sequence of successive images to a second display unit 12 DISP2 in order to assist the pilot in controlling the aircraft AC.

By way of example, the modules described above can correspond to algorithms implemented in a software or electronic manner in a central processing unit. In particular, the modules can be stored in at least one memory area of the central processing unit.

Figure 3:
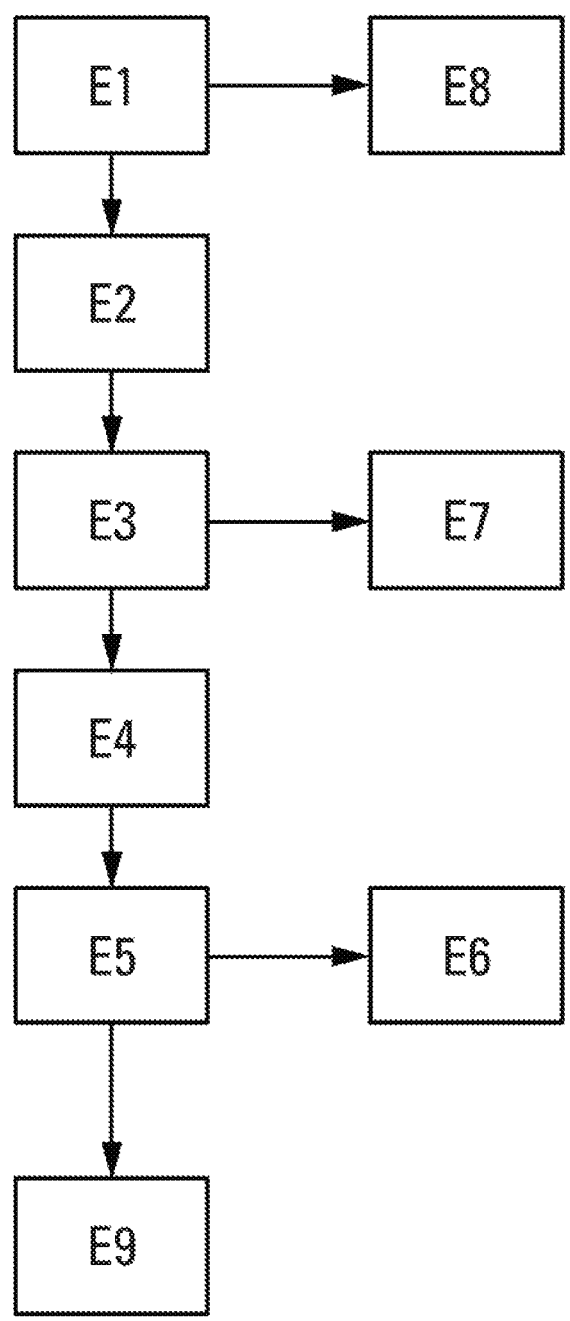
FIG. 3 is a block diagram of the method.

The landing assistance device 1, such as described above, implements steps of a method for assisting the landing of an aircraft AC in a phase of descent for the purpose of a landing on a runway T with the help of an instrument landing assistance module 7 (FIG. 3).

Said method comprises an image capturing step E1, implemented by the image capturing module 2, consisting of capturing a sequence of successive images of the ground.

During the descent, if the aircraft AC is situated below a first altitude h1 and above a second altitude h2 lower than the first altitude h1, the method also comprises:

an image processing step E2, implemented by the image processing module 3, consisting of processing the successive images captured in the image capturing step E1;

a monitoring step E3, implemented by the monitoring module 4, consisting of detecting on the images processed in the image processing step E2 at least one visual characteristic 14 corresponding to a runway T, called a visual characteristic.

If at least one visual characteristic 14 is detecting during the monitoring step E3, the method comprises the following steps:

a computation step E4, implemented by the computation module 5, consisting of computing a current position 16 of the aircraft AC relative to the runway T on the basis of the visual characteristic or characteristics 14 detected in the monitoring step E3;

a comparison step E5, implemented by the comparison module 6, consisting of comparing, on the one hand, the current position computed in the computation step E4 with, on the other hand, a signal representative of a current position transmitted to the comparison module 6 by the instrument landing assistance module 7.

If the current positions are not substantially identical, the method comprises a first transmission step E6, implemented by a first transmission module 8, consisting of transmitting a signal representative of a go-around warning to a first display unit display unit 10 which then displays a warning requesting the pilot to initiate a go-around 18.

The comparison step ES consists of comparing the current position 16 computed by the computation module 5 with the signal representative of a current position transmitted to the comparison module 6 by the instrument landing assistance module 7 by calculating the distance between these two positions. The current positions are substantially identical if the distance is less than a predetermined limit value.

If no visual characteristic is detected in the monitoring step E3, the method comprises a second transmission step E7, implemented by the second transmission module 9, consisting of transmitting a signal representative of a go-around warning to the first display unit 10.

The method comprises moreover a third transmission step E8, implemented by a third transmission module 11, consisting of transmitting the sequence of successive images to a second display unit 12.

During the descent, if the aircraft AC is situated below the second altitude h2, the pilot of the aircraft AC visually checks if the runway T is visible in step E9.

If the runway T is visible, the aircraft AC continues its decent with the help of an automatic pilot module or the pilot continues the descent of the aircraft AC manually for a landing of the aircraft AC on the runway T. If not, the pilot initiates a go-around 18.

The landing assistance device can be comprised in a landing assistance system 17 which comprises moreover an instrument landing assistance module (7) and at least one display unit (10, 12). While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting the landing of an aircraft in a phase of descent for the purpose of a landing on a runway with the help of an instrument landing assistance module, the method comprising:
   an image capturing step, implemented by an image capturing module, including capturing a sequence of successive images of the ground;
   during the descent, if the aircraft is situated below a first altitude and above a second altitude lower than the first altitude, the method comprises:
      an image processing step, implemented by an image processing module, including processing the successive images captured in the image capturing step;
      a monitoring step, implemented by a monitoring module, including identifying on the images processed in the image processing step at least one visual characteristic corresponding to a runway, called a visual characteristic, wherein the at least one visual characteristic comprises at least one of: approach lights of the runway or a central axis of the runway, wherein the approach lights are detected by a contour detection sub-module, and wherein the center axis of the runway is determined by comparing characteristics of an image and characteristics of a mirror image;
   wherein, if at least one visual characteristic is identified during the monitoring step, the method comprises:
      a computation step, implemented by a computation module, including computing a current position of the aircraft relative to the runway on the basis of the visual characteristic or characteristics identified in the monitoring step;
      a comparison step, implemented by a comparison module, including comparing the current position computed in the computation step with a signal representative of a current position transmitted to the comparison module by the instrument landing assistance module;
      if the computed current position and the transmitted current position are not substantially identical, the method comprises a first transmission step, implemented by a first transmission module, including transmitting a signal representative of a go-around warning to a first display unit, and
   wherein, if no visual characteristic is identified in the monitoring step, the method comprises a second transmission step, implemented by a second transmission module, including transmitting a signal representative of a go-around warning signal to the first display unit.

2. The method as claimed in claim 1, wherein the comparison step includes comparing the current position computed by the computation module with the signal representative of a current position transmitted to the comparison module by the instrument landing assistance module by computing the distance between the computed and transmitted positions, the computed and transmitted current positions being considered substantially identical if the distance is less than a predetermined limit value.

3. The method as claimed in claim 1, further comprising a third transmission step, implemented by a third transmission module, including transmitting the sequence of successive images to a second display unit.

4. The method as claimed in claim 1, wherein the first altitude is substantially equal to 200 feet and the second altitude is substantially equal to 100 feet.

5. The method as claimed in claim 1, wherein the first altitude is substantially equal to 200 feet and the second altitude is substantially equal to 50 feet.

6. A landing assistance device for assisting the landing of an aircraft in a phase of descent for the purpose of a landing on a runway with the help of an instrument landing assistance module,
   wherein the device comprises:
      an image capturing module configured for capturing a sequence of successive images of the ground;
      an image processing module configured for processing the successive images captured by the image capturing module, during the descent, if the aircraft is situated below a first altitude and above a second altitude lower than the first altitude;
      a monitoring module configured for identifying on the images processed by the image processing module at least one visual characteristic corresponding to a runway, called a visual characteristic, wherein the at least one visual characteristic comprises at least one of: approach lights of the runway or a central axis of the runway, wherein the approach lights are detected by a contour detection sub-module, and wherein the center axis of the runway is determined by comparing characteristics of an image and characteristics of a mirror image;
      a computation module configured for computing a current position of the aircraft relative to the runway on the basis of the visual characteristic or characteristics identified by the monitoring module;
      a comparison module configured for comparing the current position computed by the computation module with a signal representative of a current position transmitted to the comparison module by the instrument landing assistance module;
      the computation module and the comparison module configured to be used if at least one visual characteristic is identified by the monitoring module,
      a first transmission module configured for transmitting a signal representative of a go-around warning to a first display unit, if the computed and transmitted current positions are not substantially identical; and
      a second transmission module configured for transmitting a signal representative of a go-around warning to the first display unit, if no visual characteristic is identified by the monitoring module.

7. The device as claimed in claim 6, further comprising a third transmission module configured for transmitting the sequence of successive images to a second display unit.

8. A landing assistance system comprising:
   a landing assistance device as claimed in claim 6,
   an instrument landing assistance module, and
   at least one display unit.

9. An aircraft, comprising a landing assistance device as claimed in claim 6.

* * * * *